(12) United States Patent
Rasmussen et al.

(10) Patent No.: US 9,010,822 B2
(45) Date of Patent: Apr. 21, 2015

(54) COMBINATION SUPPORT STAND AND CARRYING HANDLE FOR PORTABLE ELECTRONIC DEVICES

(71) Applicants: Kara Megan Rasmussen, Aurora, OH (US); Steven Frank Rasmussen, Aurora, OH (US)

(72) Inventors: Kara Megan Rasmussen, Aurora, OH (US); Steven Frank Rasmussen, Aurora, OH (US)

(*) Notice: Subject to any disclaimer, the term of this patent is extended or adjusted under 35 U.S.C. 154(b) by 0 days.

(21) Appl. No.: 14/031,819

(22) Filed: Sep. 19, 2013

(65) Prior Publication Data

US 2014/0077514 A1    Mar. 20, 2014

Related U.S. Application Data

(60) Provisional application No. 61/702,803, filed on Sep. 19, 2012.

(51) Int. Cl.
| | |
|---|---|
| G06F 1/16 | (2006.01) |
| H05K 5/00 | (2006.01) |
| F16M 13/06 | (2006.01) |
| F16M 11/10 | (2006.01) |
| F16M 11/38 | (2006.01) |
| F16M 13/00 | (2006.01) |
| A47B 23/04 | (2006.01) |

(52) U.S. Cl.
CPC ............... *F16M 13/06* (2013.01); *F16M 11/10* (2013.01); *F16M 11/38* (2013.01); *F16M 13/00* (2013.01); *A47B 23/042* (2013.01); *Y10S 248/919* (2013.01)

(58) Field of Classification Search
CPC ............... A45F 2200/0516; A45F 2200/0525; H04M 1/0279; H04M 1/0281; F16M 13/00; F16M 13/06; F16M 11/10; F16M 11/38; A47B 23/042

USPC .......... 294/137, 141, 142, 169; 248/166, 454, 248/688, 918–924; 224/929, 930; 361/679.3, 679.56, 679.59; 206/320; 16/422

See application file for complete search history.

(56) References Cited

U.S. PATENT DOCUMENTS

| | | | | |
|---|---|---|---|---|
| 3,984,074 | A | * | 10/1976 | Forman et al. ................. 248/451 |
| 5,515,754 | A | * | 5/1996 | Elkins .......................... 81/177.9 |
| 6,807,050 | B1 | | 10/2004 | Whitehorn et al. |
| 7,450,372 | B2 | | 11/2008 | Lin et al. |
| 7,542,276 | B2 | * | 6/2009 | Chang ...................... 361/679.59 |
| 7,712,719 | B2 | | 5/2010 | Derry et al. |
| 7,937,810 | B2 | * | 5/2011 | Hu .................................. 16/241 |
| 8,016,107 | B2 | * | 9/2011 | Emsky .......................... 206/320 |
| 8,186,639 | B2 | | 5/2012 | Wang |
| 8,400,767 | B2 | * | 3/2013 | Yeom et al. .............. 361/679.59 |
| 8,625,304 | B2 | * | 1/2014 | Shen et al. .................... 361/809 |
| 8,649,166 | B2 | * | 2/2014 | Wu et al. .................. 361/679.27 |
| 2005/0121594 | A1 | * | 6/2005 | Kuo ............................... 248/676 |
| 2005/0269479 | A1 | * | 12/2005 | Yeh et al. ...................... 248/457 |
| 2006/0050471 | A1 | * | 3/2006 | Chen ............................. 361/681 |
| 2008/0251659 | A1 | | 10/2008 | Matias |
| 2008/0265109 | A1 | | 10/2008 | Derry et al. |

(Continued)

*Primary Examiner* — Dean Kramer
(74) *Attorney, Agent, or Firm* — Tucker Ellis LLP

(57) ABSTRACT

A combination support stand and carrying handle apparatus for use with an associated tablet device having a generally rectangular conformation with opposite front and back substantially planar surfaces. The apparatus includes a mounting member, a handle member, and a support stand for holding the associated tablet device on surfaces at selected angles for convenience of use of the tablet device. The carrying handle is grippable by the hand of an associated user. The support stand apparatus and carrying handle apparatus may be provided individually without the other.

18 Claims, 10 Drawing Sheets

(56) References Cited

U.S. PATENT DOCUMENTS

| | | |
|---|---|---|
| 2009/0095854 A1 | 4/2009 | Forbes et al. |
| 2009/0120980 A1* | 5/2009 | Calayo .......................... 224/257 |
| 2010/0243850 A1 | 9/2010 | Derry |
| 2011/0164357 A1 | 7/2011 | Yeom et al. |
| 2011/0260014 A1 | 10/2011 | Chen |
| 2011/0279993 A1* | 11/2011 | Su .................................. 361/807 |
| 2011/0286171 A1 | 11/2011 | Franz et al. |
| 2012/0170212 A1 | 7/2012 | Gallouzi et al. |
| 2012/0223194 A1 | 9/2012 | Huang et al. |
| 2012/0262853 A1 | 10/2012 | Sung |
| 2013/0001382 A1* | 1/2013 | Jang ........................... 248/176.1 |

* cited by examiner

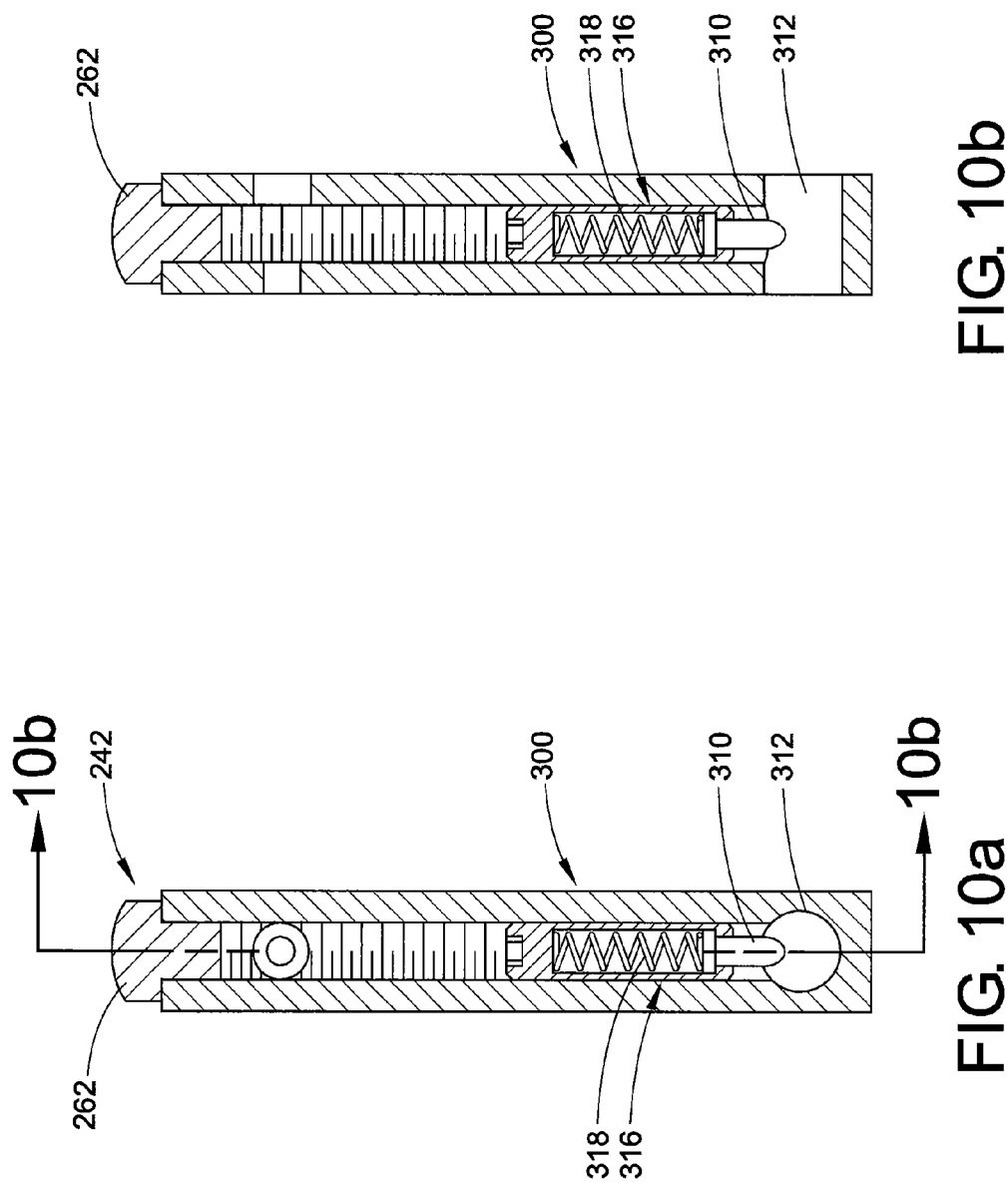

US 9,010,822 B2

COMBINATION SUPPORT STAND AND CARRYING HANDLE FOR PORTABLE ELECTRONIC DEVICES

CROSS-REFERENCE TO RELATED APPLICATION

This application claims the benefit of U.S. Provisional Application No. 61/702,803, filed Sep. 19, 2012, the contents of which are included herein by reference.

TECHNICAL FIELD

The present disclosure relates to accessories for portable tablet devices and will be described with particular reference thereto. However, it will be appreciated that the embodiments herein will find application for use with any portable electronic devices.

BACKGROUND

By their very nature, tablet devices such as iPads, Kindle Fires, Nooks, Galaxies, and the like, are portable. Users therefore often carry the tablet devices from place to place. It is important, however, that the users not drop the tablet devices as they are somewhat fragile. The smooth outer casings and interface screens of the tablet devices make them hard to carry without first placing them into a carrying bag or the like.

Users desire to interface with the portable tablet devices from place to place and often times during travel between destinations. It is important, therefore, to be able to quickly deploy the electronic device from its carrying environment and place it into an operable condition such as onto a desktop, work surface, or the like.

BRIEF DESCRIPTION OF THE DRAWINGS

The accompanying drawings incorporated herein and forming a part of the specification illustrate an example embodiment.

FIG. 7b is a side elevational view of the rack handle system of FIG. 8a taken along line 7b-7b of FIG. 7a.

FIG. 9b is a side elevational view of the base member of FIG. 7a taken along line 9b-9b of FIG. 9a.

FIG. 10a is a cross-sectional view of a leg member of the rack handle system of FIG. 1 taken along line 10a-10a of FIG. 8.

FIG. 10b is a cross-sectional view of the leg member of the rack handle system of FIG. 1 taken along line 10b-10b of FIG. 10a.

OVERVIEW OF EXAMPLE EMBODIMENTS

An accessory for a portable electronic device is provided. In accordance with an example embodiment described herein, the accessory is a rack handle system for a portable handheld electronic device. In particular, the accessory of the example embodiment is a combination support stand and carrying handle apparatus for use with an associated tablet device having a generally rectangular conformation with opposite front and back substantially planar surfaces.

In an example embodiment, the apparatus comprises a mounting member, a handle member, and a support stand. The mounting member comprises a first end disposed on the substantially planar rear surface of the associated tablet device and a second end opposite the first end and spaced apart from the substantially planer rear surface of the associated tablet device by a predetermined distance D. The handle member of the combination support stand carrying handle apparatus is operatively coupled with the second end of the mounting member and extends in a direction substantially parallel with the substantially planar rear surface of the associated tablet device and is spaced apart from the substantially planar rear surface of the associated tablet device by the predetermined distance D. In addition, the support stand of the apparatus of the example embodiment comprises a free first end configured to engage an associated work surface for supporting the associates tablet device relative to the associated work surface, and a second end opposite the first end. The second end is pivotably coupled with at least one of the mounting members or the handle member. In that way, the support stand is pivotable in selected positions relative to at least one of the mounting member and the handle member for supporting the associated tablet device in selected positions relative to the associated work surface.

For purposes of summarizing the disclosure, certain aspects, advantages, and novel features of the example embodiment have been described herein. It is to be understood that not necessarily all such advantages may be achieved in accordance with any particular embodiment of the claims herein. Thus, the claims may be embodied or carried out in a manner that achieves or optimizes one advantage or group of advantages as taught herein without necessarily achieving other advantages as maybe taught or suggested herein.

DESCRIPTION OF EXAMPLE EMBODIMENTS

Figure 1:
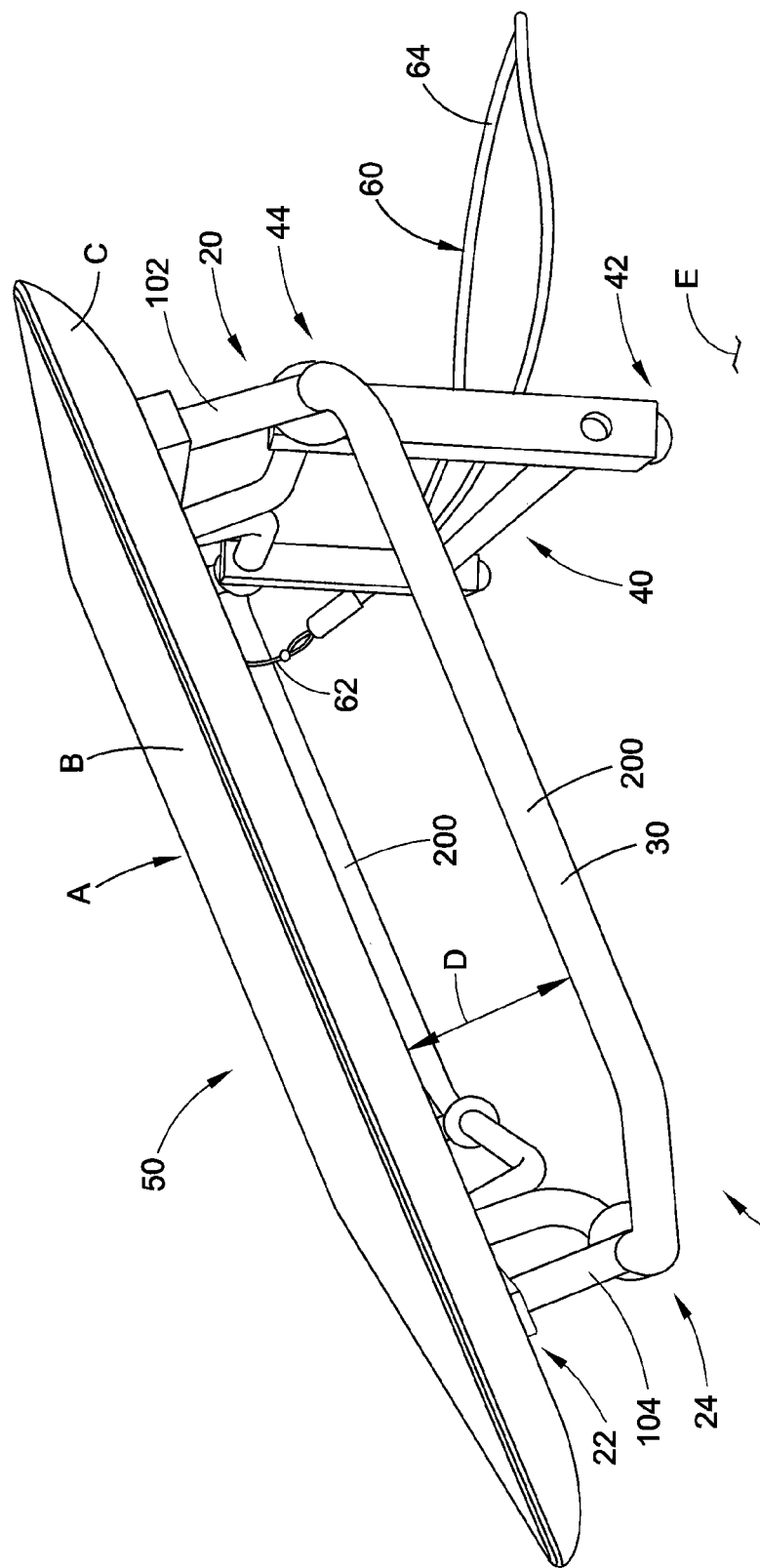
FIG. 1 is a side perspective view of a rack handle system in accordance with the example embodiment supporting an associated tablet device in a first orientation.
Figure 2:
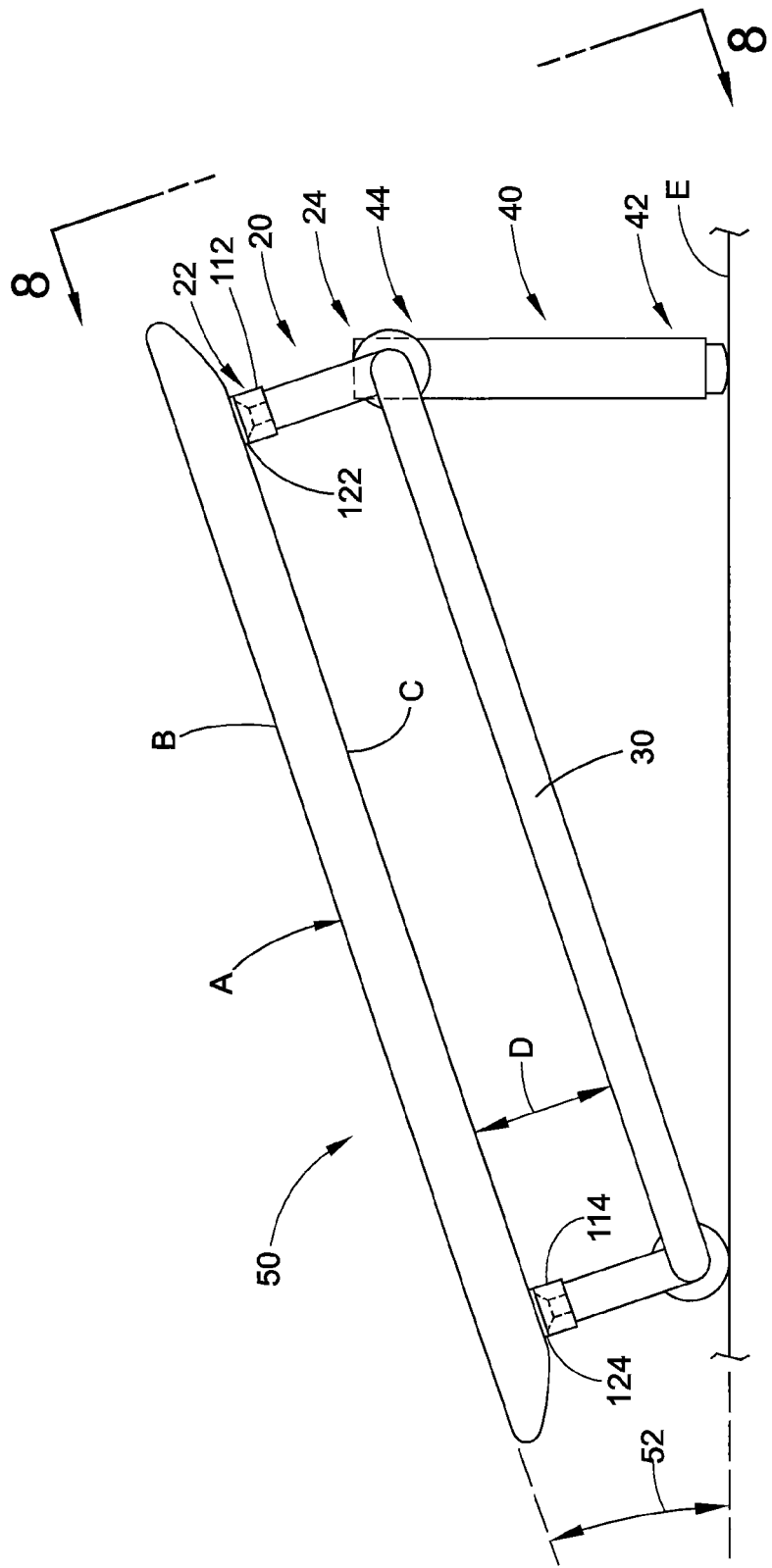
FIG. 2 is a side elevational view of the rack handle system of FIG. 1 supporting the associated tablet device in the first orientation.

With reference to the drawing Figures, wherein the showings are for illustrating an example embodiment only and not for purposes of limiting the claims herein, FIGS. 1 and 2 show side perspective and elevational views, respectively, of a combination support stand and carrying handle apparatus 10 in accordance with the example embodiment. The apparatus 10 is shown together with an associated tablet device A having a generally rectangular conformation with opposite front B and back C substantially planar surfaces. It is to be appreciated that the associated tablet device A forms no part of the example embodiment but is shown in the drawings herein only for purposes of helping to facilitate the description of the apparatus 10 of the example embodiment.

In general, the apparatus 10 comprises a mounting member 20, a handle member 30, and a support stand 40. The mounting member 20 comprises a first end 22 disposed on the substantially planar rear surface C of the associated tablet device A, and a second end 24 opposite the first end 22 and spaced apart from the substantially planar rear surface C of the associated tablet device A by a predetermined distance D. While the preferred embodiment described herein comprises an apparatus with combined handle member 30 and support stand 40 portions, it is to be appreciated that other embodiments include the handle member 30 and the support stand 40 being provided separately without the other in apparatus for use with the associated tablet device A for carrying and supporting the tablet, respectively. An example embodiment is a handle member. A further example embodiment is a support stand.

The handle member 30 of the apparatus 10 of the example embodiment is operatively coupled with the second end 24 of the mounting member 20 substantially as illustrated. The handle member 30 extends in direction substantially parallel with the substantially planar rear surface C of the associated tablet device A and is spaced apart from the substantially planar rear surface C of the associated tablet device A by the predetermined distance D.

With continued reference FIGS. 1 and 2, the support stand 40 of the apparatus 10 of the example embodiment comprises a free first end 42 configured to engage an associated work surface E for supporting the associated tablet device A relative to the associated work surface E, and a second end 44 opposite the first end 42 for coupling the support stand 40 with the handle member 30. In accordance with the example embodiment illustrated, the second end 44 of the support stand 40 is pivotably coupled with at least the mounting member 20 and/or the handle member 30, wherein the support stand 40 is pivotably movable into selected positions relative to the mounting member 20 and/or the handle member 30 for supporting the associated tablet device A in selected positions relative to the associated work surface E. In the example embodiment, the support stand 40 is pivotably connected with the handle member 30. However, it is to be appreciated that the support end 40 may be pivotably connected with the mounting member 20, the handle member 30 or combinations of the mounting member and/or the handle member.

In addition to the above, it is to be appreciated that the support stand is pivotable in selected positions relative to the handle member for supporting the associated tablet device A in various selected positions including, for example, the first position 50 illustrated in FIGS. 1 and 2. More particularly, in the illustrated first position 50, the associated tablet device A is held at a predetermined angle of inclination 52 relative to the associated work surface E of about 19 degrees. It has been found that an angle of inclination 52 of about 19 degrees in the first position 50 illustrated in FIGS. 1 and 2 is convenient for users of the associated tablet device A when typing or entering and/or retrieving information to or from the tablet device. At this angle of inclination, less stress is placed on the user's wrists and hands than would be incurred in a flat orientation.

Figure 3:
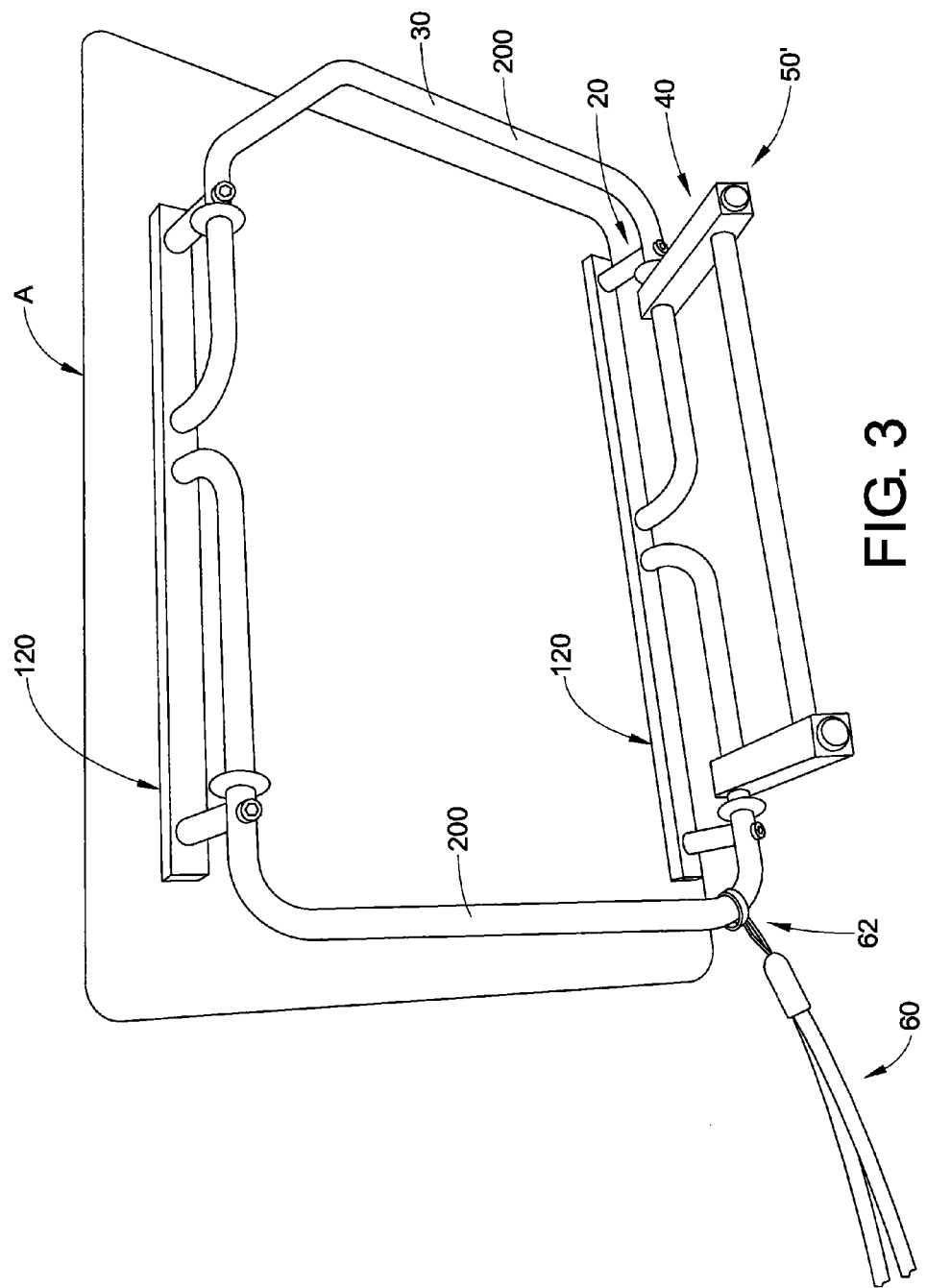
FIG. 3 is a rear perspective view of the rack handle system of FIG. 1 supporting the associated tablet device in a second orientation.
Figure 4:
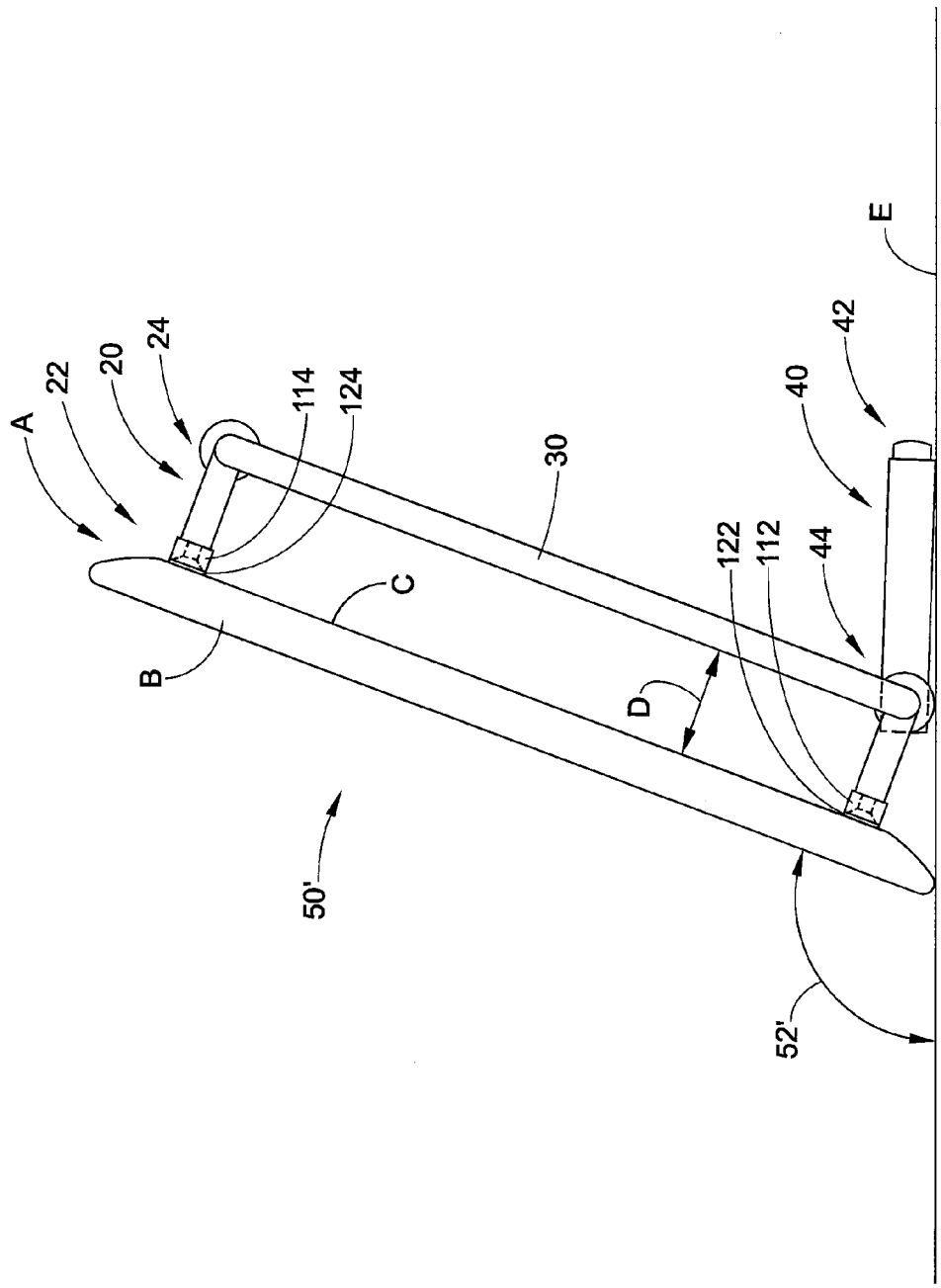
FIG. 4 is a side elevational view of the rack handle system of FIG. 1 supporting the associated tablet device in the second orientation.

The subject combination support stand and carrying handle 10 in accordance with the example embodiment is shown FIGS. 3 and 4 holding the associated tablet device A in a second position 50' whereat the associated tablet device A is held at an angle of inclination 52' relative to the associated work surface of about 109 degrees (19 degrees from vertical). It has been found that the second position at the second angle of inclination is highly desirable for watching videos, viewing photos, or live-streaming data on the associated tablet device A.

Figure 5:
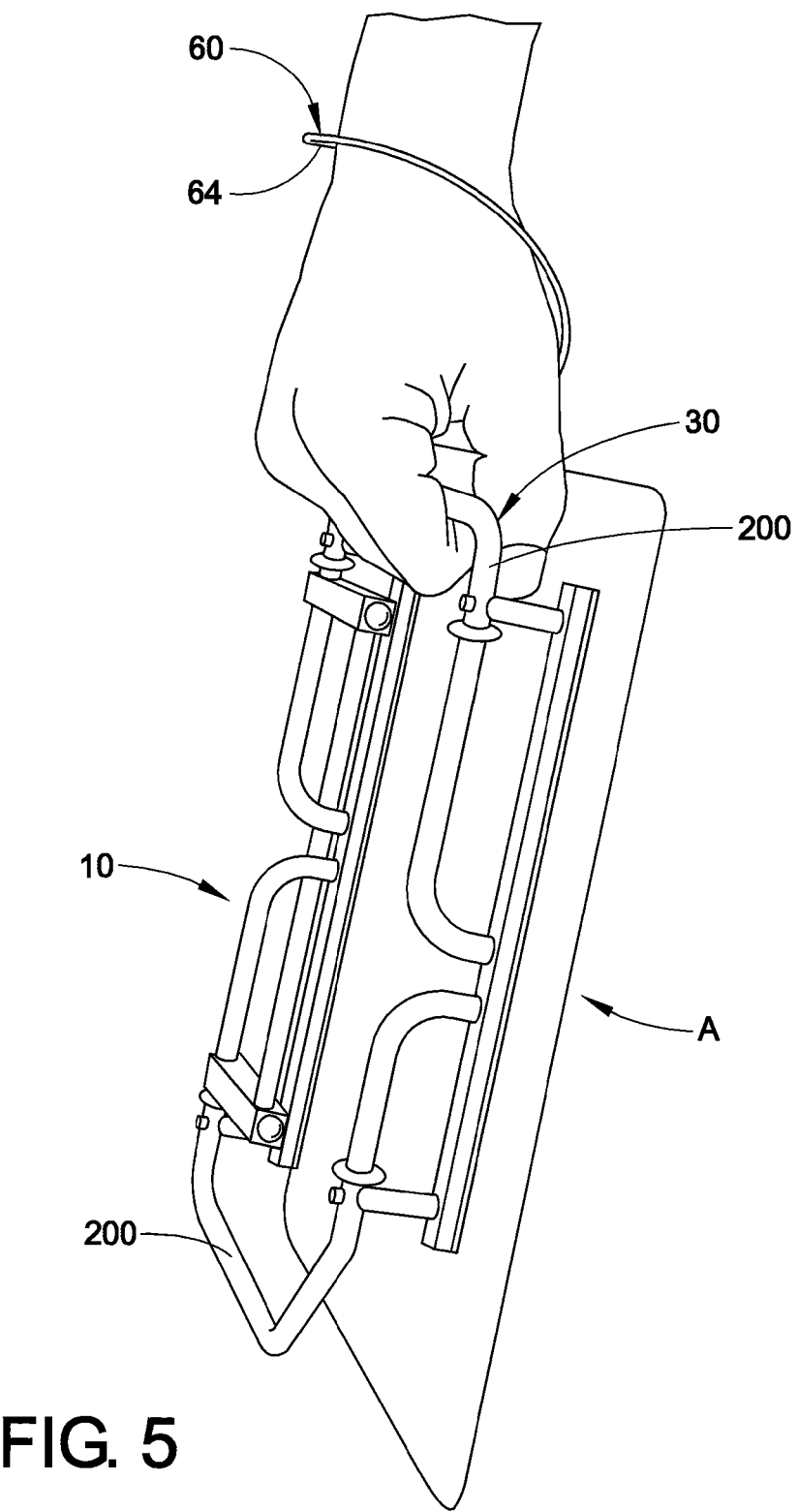
FIG. 5 is a side perspective view illustrating the rack handle system of FIG. 1 being carried by a handle member thereof.
Figure 6:
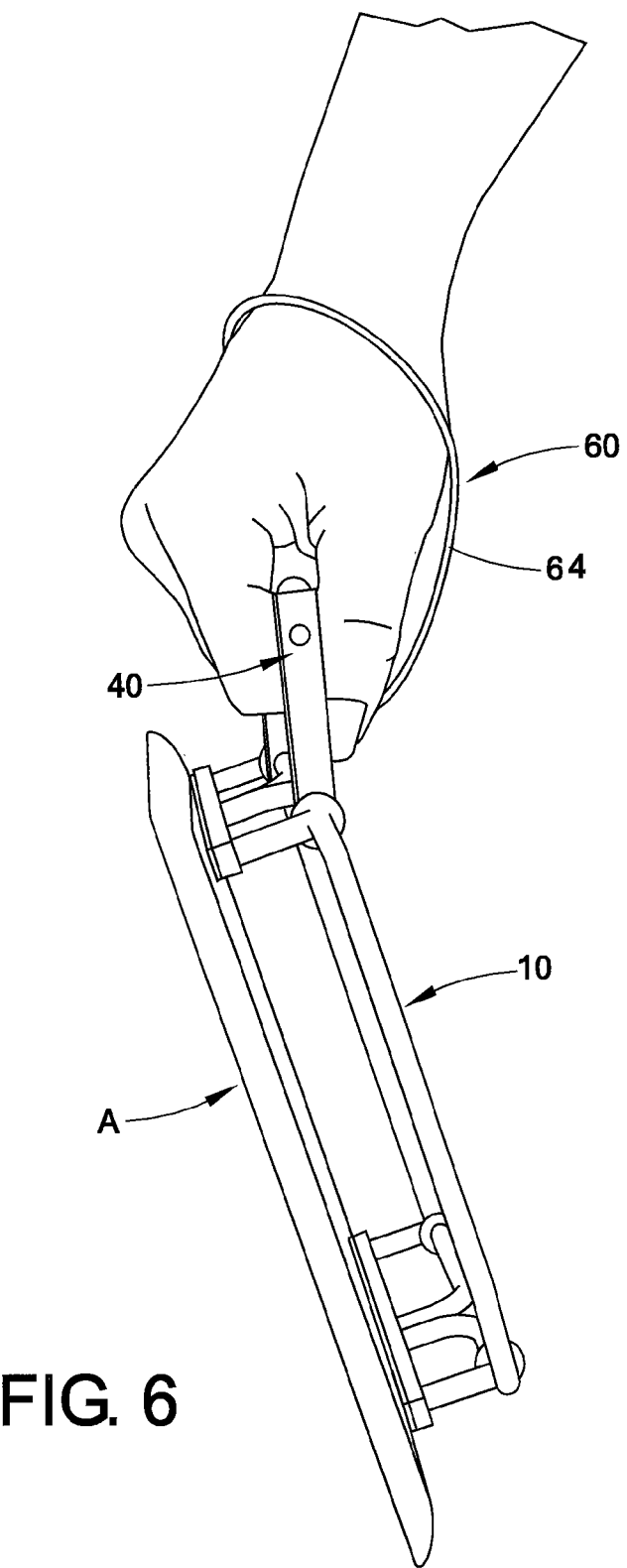
FIG. 6 is a side perspective view illustrating the rack handle system of FIG. 1 being carried by a support stand member thereof.

With continued reference to FIGS. 1-4 and with additional reference to FIGS. 5 and 6, it is to be appreciated that the subject combination support stand and carrying handle is useful for not only supporting the associated tablet device A relative to the associated work surface E, but also for carrying the tablet device coupled with the apparatus by means of the handle member 30 such as shown for example in FIG. 5 or by the support stand 40 such as shown in FIG. 6. In the example embodiment, the predetermined distance D as provided by the distance between the first and second ends 22, 24 of the mounting member 20 is selected to easily accommodate the thumb and fingers of the associated user when carrying the apparatus 10 by the handle member 30 such as shown in FIG. 5. In addition, as noted above, the support stand 40 is pivotably connected with the handle member 30 and is moveable relative thereto into selected positions such as in a fully extended position illustrated, for example, in FIG. 6 whereby the associated user may carry the tablet device connected with the subject apparatus as a "lunch box" modality.

In addition to the above, for safety reasons and to help prevent accidents from occurring such as, for example, caused by accidentally dropping the tablet device, the subject apparatus 10 further includes a safety wrist strap 60 having a coupling end 62 fastened with the handle member 30 and a loop end 64 configured to receive the hand and wrist of the associated user such as shown in FIGS. 5 and 6 for example. In an embodiment the coupling end 62 forms a lasso wherein the safety wrist straps may be selectively removed from the handle member as necessary or desired.

Figure 7B:
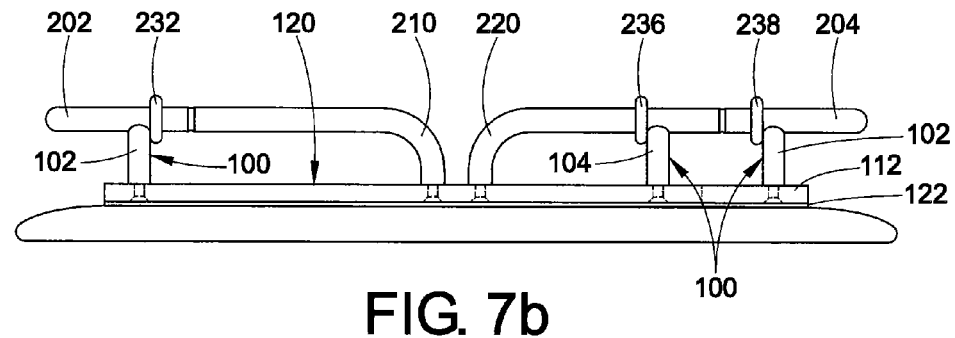
Figure 7A:
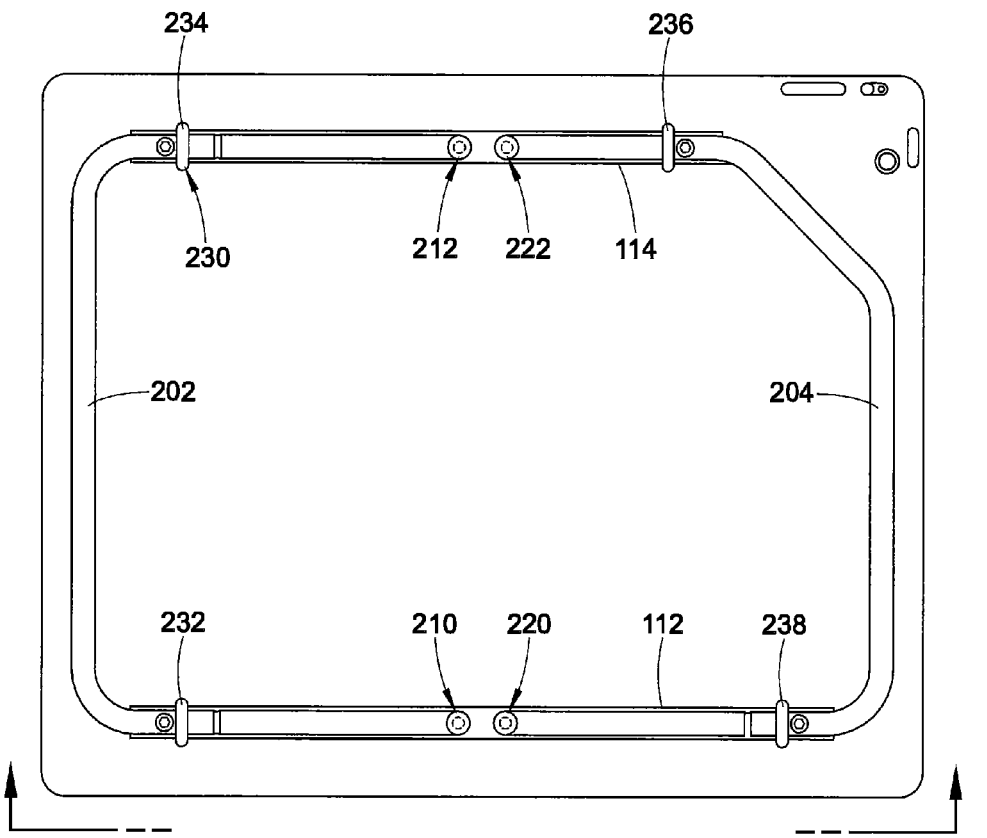
FIG. 7a is a bottom plan view of the rack handle system of FIG. 1 with a support stand portion thereof removed therefrom.
Figure 8:
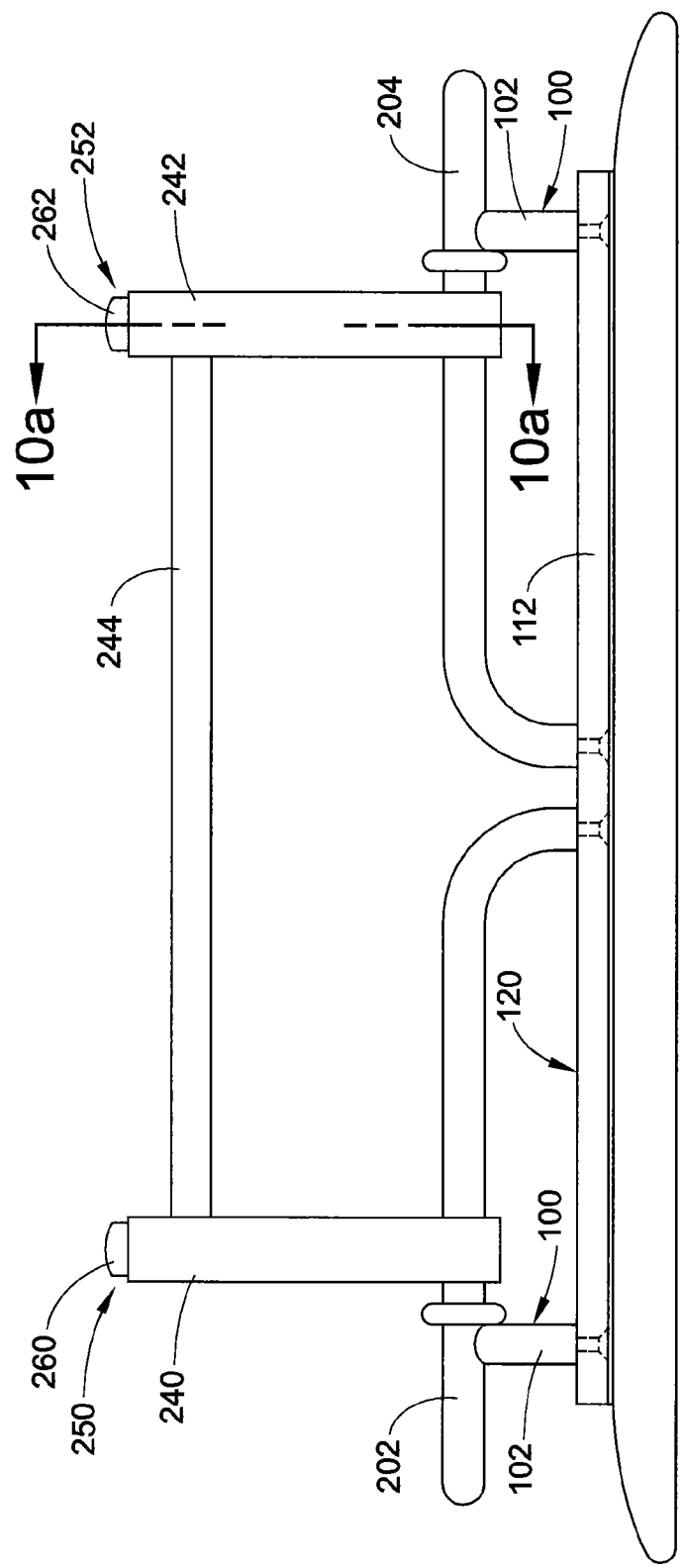
FIG. 8 is a side elevational view of the rack handle system of FIG. 1 taken along line 8-8 of FIG. 2.
Figure 9B:
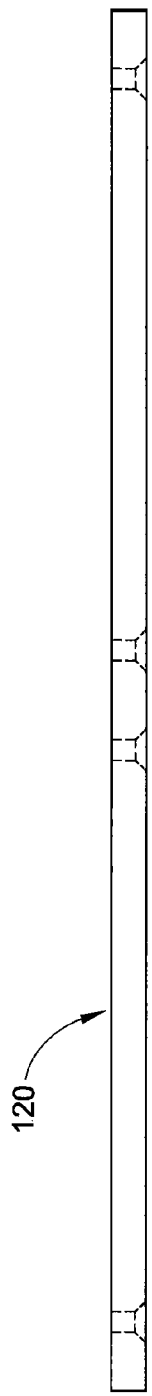
Figure 9A:
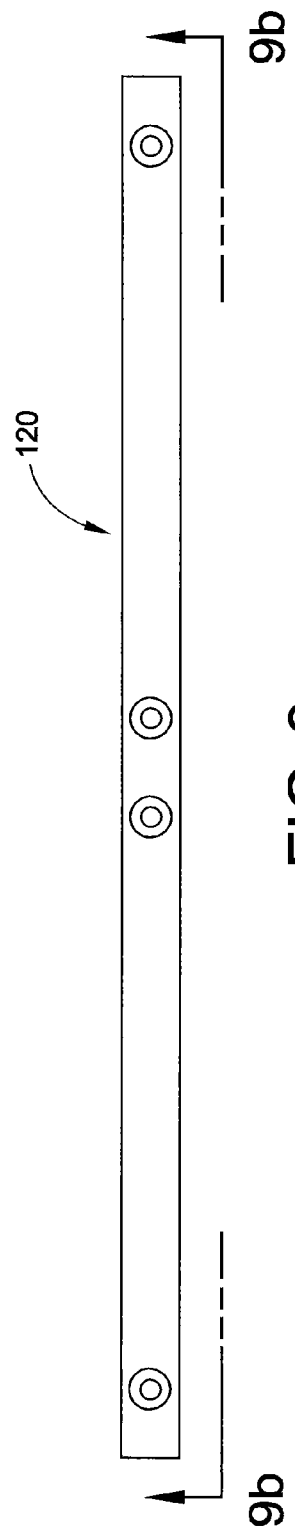
FIG. 9a is a plan view of a base member forming a mounting member of the rack handle system of FIG. 1.

FIGS. 7a and 7b show the subject apparatus 10 with the support stand removed therefrom for ease of illustration and discussion, and FIG. 8 shows the apparatus 10 of the example embodiment with the support stand 40 attached and in an extended conformation. With reference now to those figures and with additional reference to FIGS. 9a, 9b, 10a, and 10b, the mounting member 20 of the example embodiment comprises a plurality of block members 100 including a first pair of block members 102 adjacent to the support stand 40 and a second pair of block members 104 on the side of the apparatus opposite from the support stand 40. The block members 100 are coupled with elongated attachment bars 120 having a general configuration such as shown, for example, in FIGS. 7a, 7b. In the example embodiment, the first pair 102 of block members 100 are coupled with a first attachment bar 112 and, similarly, the second pair 104 of block members 100 coupled with a second attachment bar 114. In the example embodiment, each of the attachment bars 112, 114 are coupled with the rear surface C of the associated tablet device A using adhesive strips 122, 124 (FIG. 4), respectively. It is to be appreciated that although adhesive strips are used in the example embodiment, other means of attaching the attachment bars 112, 114 to the rear surface C of the associated tablet device A any other attachment means or techniques now known or hereinafter developed may be used.

As best shown in FIGS. 1, 3, and 7a, the handle member 30 comprises at least one grippable member 200 extending between the plurality of block members 100 wherein the grippable member 200 has an elongate generally cylindrical shape configured to be gripped by a hand of an associated user of the associated tablet device such as shown, for example, in FIGS. 5 and 6. In the example embodiment, the grippable member 200 includes a pair of first and second C-shaped grip members 202, 204 (FIGS. 7a and 7b) extending essentially around the outer peripheral edges of the rear surface C of the associated tablet device. The first grip member 202 defines opposite first and second ends 210, 212 having a generally bent configuration for selective attachment with the first and second attachment bars 112, 114, respectively. Similarly, the second grip member 204 defines opposite first and second ends 220, 222, having a generally curved configuration and being selectively connected with the first and second attachment bars 112, 114.

In the example embodiment illustrated, the grippable members 200 carry anti-friction members 230 (FIG. 7) in the form of a plurality of rubber o-rings 232-238 which are preferably disposed at the four corners of the rear surface C of the associated tablet device A. The anti-friction members 230 help stabilize the apparatus 10 relative to the associated work surface E during use of the associated tablet device A.

Further in the example embodiment, the first free end 42 (FIG. 4) of the support stand 40 comprises at least two leg members 240, 242 (FIG. 8) for supporting the associated tablet device in the selected positions relative to the associated work surface. The leg members 240, 242 are mutually coupled by a timing bar 244 for joint movement of the leg members between the selected positions relative to the handle member. In the example embodiment, the timing bar 244 has an elongate generally cylindrical shape configured to be gripped by the hand of an associated user such as shown, for example, in FIG. 6.

The free ends 250, 252 (FIG. 8) of the leg members 240, 242 each carry an anti-friction member 260, 262 to assist in holding the subject apparatus 10 stationary relative to the associated work surface E when the apparatus is disposed in the first position 50 such as shown, for example, in FIGS. 1 and 2. In the example embodiment, the anti-friction members are mushroom-shaped members formed of a suitable low friction material such as rubber for example.

FIGS. 10*a* and 10*b* illustrate a detent mechanism 300 used in the example embodiment for holding the support stand 40 in plural selected positions. In the embodiment, each of the leg members 240, 242 carries a ball member 310 biased into engagement with plural detents 312 formed at selected locations in the handle member 30, wherein the ball members are urged into engagement with the detents by a biasing means 316 such as a spring 318 for example.

The example embodiment herein has been described with reference to preferred structures, shapes, and conformations. However, it is to be appreciated that the claims herein are not limited to those precise structures or their specific descriptions. Rather, the claims are to be given their broadest possible interpretation as appropriate.

In addition, while a certain embodiment has been described, this embodiment has been presented by way of example only, and is not intended to limit the scope of the claimed inventions. Indeed, the novel embodiment described herein may be embodied in a variety of other forms; furthermore, various omissions, substitutions, and changes in the form of the embodiment described herein may be made without departing from the spirit of the claimed invention.

The invention claimed is:

1. A combination support stand and carrying handle apparatus for use with an associated tablet device having a generally rectangular conformation with opposite front and rear substantially planar surfaces, the apparatus comprising:
  a mounting member comprising a first end disposed on the substantially planar rear surface of the associated tablet device, a second end opposite the first end and spaced apart from the substantially planar rear surface of the associated tablet device by a predetermined distance D, and a plurality of block members mutually spaced apart relative to the substantially planar rear surface of the associated tablet device;
  a handle member operatively coupled with the second end of the mounting member by the plurality of block members, the handle member extending in a direction substantially parallel with the substantially planar rear surface of the associated tablet device and spaced apart from the substantially planar rear surface of the associated tablet device by the predetermined distance D; and
  a support stand comprising a first end configured to engage an associated work surface for supporting the associated tablet device relative to the associated work surface, and a second end opposite the first end and being pivotably coupled with at least one of the mounting member and the handle member wherein the support stand is pivotable in selected positions relative to the at least one of the mounting member and the handle member for supporting the associated tablet device in selected positions relative to the associated work surface;
  wherein the plurality of block members comprises at least one block member disposed adjacent to each corner of the rear surface of the associated tablet device having the generally rectangular conformation;
  wherein the handle member comprises a first generally cylindrical grippable member extending between a first pair of the plurality of block members and a second generally cylindrical grippable member extending between a second pair of the plurality of block members.

2. The combination support stand and carrying handle apparatus according to claim 1, wherein:
  the first end of the support stand comprises at least two leg members for supporting the associated tablet device in the selected positions relative to the associated work surface.

3. A combination support stand and carrying handle apparatus for use with an associated tablet device having a generally rectangular conformation with opposite front and rear substantially planar surfaces, the apparatus comprising:
  a mounting member comprising a first end disposed on the substantially planar rear surface of the associated tablet device and a second end opposite the first end and spaced apart from the substantially planar rear surface of the associated tablet device by a predetermined distance D;
  a handle member operatively coupled with the second end of the mounting member, the handle member extending in a direction substantially parallel with the substantially planar rear surface of the associated tablet device and spaced apart from the substantially planar rear surface of the associated tablet device by the predetermined distance D; and
  a support stand comprising a first end configured to engage an associated work surface for supporting the associated tablet device relative to the associated work surface, and a second end opposite the first end and being pivotably coupled with at least one of the mounting member and the handle member wherein the support stand is pivotable in selected positions relative to the at least one of the mounting member and the handle member for supporting the associated tablet device in selected positions relative to the associated work surface;
  wherein the mounting member comprises a plurality of block members mutually spaced apart on the substantially planar rear surface of the associated tablet device;
  wherein the handle member comprises at least one grippable member extending between the plurality of block members, wherein the at least one grippable member has an elongate generally cylindrical shape configured to be gripped by a hand of an associated user of the associated tablet device;

wherein the first end of the support stand comprises at least two leg members for supporting the associated tablet device in the selected positions relative to the associated work surface;

wherein the plurality of block members comprises at least one block member disposed adjacent to each corner of the rear surface of the associated tablet device having the generally rectangular conformation;

wherein the handle member comprises a first generally cylindrical grippable member extending between a first pair of the plurality of block members and a second generally cylindrical grippable member extending between a second pair of the plurality of block members;

wherein the at least two leg members of the support stand are mutually coupled for joint movement between the selected positions relative to the at least one of the mounting member and the handle member.

4. The combination support stand and carrying handle apparatus according to claim 3, further comprising:

a timing bar member mutually coupling the at least two leg members of the support stand for joint movement between the selected positions relative to the at least one of the mounting member and the handle member, wherein the timing bar member has an elongate generally cylindrical shape configured to be gripped by the hand of the associated user of the associated tablet device.

5. The combination support stand and carrying handle apparatus according to claim 4, wherein:

the second end of the support stand is pivotably coupled with the handle member wherein the support stand is pivotable in the selected positions relative to the handle member for supporting the associated tablet device in the selected positions relative to the associated work surface.

6. The combination support stand and carrying handle apparatus according to claim 5, wherein:

at least one of the second end of the support stand and the handle member defines at least one detent, and the other of the second end of the support stand and the handle member carries a ball member biased into selected engagement with the detent for locating the support stand in the selected positions relative to the handle member for supporting the associated tablet device in the selected positions relative to the associated work surface.

7. The combination support stand and carrying handle apparatus according to claim 4, further comprising:

a wrist strap operatively coupled on a first end thereof with the handle member, the wrist strap defining a loop on a second end thereof wherein the loop is adapted for encircling a wrist of an associated user of the associated tablet device, wherein the first end of the wrist strap forms a lasso.

8. The combination support stand and carrying handle apparatus according to claim 3, wherein none of the plurality of block members forming the first pair of the plurality of block members also form part of the second pair of the plurality of block members.

9. A carrying handle apparatus for use with an associated tablet device having a generally rectangular conformation with opposite front and rear substantially planar surfaces, the apparatus comprising:

a mounting member comprising a first end disposed on the substantially planar rear surface of the associated tablet device, a second end opposite the first end and spaced apart from the substantially planar rear surface of the associated tablet device by a predetermined distance D, and a plurality of block members mutually spaced apart on the substantially planar rear surface of the associated tablet device; and a handle member operatively coupled with the second end of the mounting member by the plurality of block members, the handle member extending in a direction substantially parallel with the substantially planar rear surface of the associated tablet device and spaced apart from the substantially planar rear surface of the associated tablet device by the predetermined distance D;

wherein the plurality of block members comprises at least one block member disposed adjacent to each corner of the rear surface of the associated tablet device having the generally rectangular conformation;

wherein the handle member comprises a first generally cylindrical grippable member extending between a first pair of the plurality of block members and a second generally cylindrical grippable member extending between a second pair of the plurality of block members.

10. The carrying handle apparatus according to claim 9, wherein:

at least one of the first or second grippable members has an elongate generally cylindrical shape configured to be gripped by a hand of an associated user of the associated tablet device.

11. A carrying handle apparatus for use with an associated tablet device having a generally rectangular conformation with opposite front and rear substantially planar surfaces, the apparatus comprising:

a mounting member comprising a first end disposed on the substantially planar rear surface of the associated tablet device and a second end opposite the first end and spaced apart from the substantially planar rear surface of the associated tablet device by a predetermined distance D; and a handle member operatively coupled with the second end of the mounting member, the handle member extending in a direction substantially parallel with the substantially planar rear surface of the associated tablet device and spaced apart from the substantially planar rear surface of the associated tablet device by the predetermined distance D;

wherein the mounting member comprises a plurality of block members mutually spaced apart on the substantially planar rear surface of the associated tablet device;

wherein the handle member comprises at least one grippable member extending between the plurality of block members, wherein the at least one grippable member has an elongate generally cylindrical shape configured to be gripped by a hand of an associated user of the associated tablet device;

wherein the plurality of block members comprises at least one block member disposed adjacent to each corner of the rear surface of the associated tablet device having the generally rectangular conformation; and wherein the handle member comprises a first generally cylindrical grippable member extending between a first pair of the plurality of block members and a second generally cylindrical grippable member extending between a second pair of the plurality of block members.

12. The carrying handle apparatus according to claim 11, further comprising:

a wrist strap operatively coupled on a first end thereof with the handle member, the wrist strap defining a loop on a second end thereof wherein the loop is adapted for encircling a wrist of an associated user of the associated tablet device.

13. The carrying handle apparatus according to claim 11, wherein none of the plurality of block members forming the first pair of the plurality of block members also form part of the second pair of the plurality of block members.

14. A support stand apparatus for use with an associated tablet device having a generally rectangular conformation with opposite front and rear substantially planar surfaces, the apparatus comprising:
   a mounting member comprising a first end disposed on the substantially planar rear surface of the associated tablet device and a second end opposite the first end and spaced apart from the substantially planar rear surface of the associated tablet device by a predetermined distance D; and
   a support stand comprising a first end configured to engage an associated work surface for supporting the associated tablet device relative to the associated work surface, and a second end opposite the first end and being pivotably coupled with the mounting member wherein the support stand is pivotable in selected positions relative to the mounting member for supporting the associated tablet device in selected positions relative to the associated work surface;
   wherein at least one of the second end of the support stand and the mounting member defines at least one detent, and the other of the second end of the support stand and the mounting member carries a ball member biased into selected engagement with the detent for locating the support stand in the selected positions relative to the mounting member for supporting the associated tablet device in the selected positions relative to the associated work surface;
   wherein the first end of the support stand comprises at least two leg members for supporting the associated tablet device in the selected positions relative to the associated work surface;
   wherein the at least two leg members of the support stand are mutually coupled for joint movement between the selected positions relative to the mounting member;
   wherein the mounting member comprises a plurality of block members mutually spaced apart on the substantially planar rear surface of the associated tablet device,
   wherein the plurality of block members comprises at least one block member disposed adjacent to each corner of the rear surface of the associated tablet device.

15. The support stand apparatus according to claim 14, further comprising:
   a timing bar member mutually coupling the at least two leg members of the support stand for joint movement between the selected positions relative to the mounting member, wherein the timing bar member has an elongate generally cylindrical shape configured to be gripped by the hand of the associated user of the associated tablet device.

16. The support stand apparatus according to claim 15, wherein:
   the second end of the support stand is pivotably coupled with the mounting member wherein the support stand is pivotable in the selected positions relative to the mounting member for supporting the associated tablet device in the selected positions relative to the associated work surface.

17. The support stand apparatus according to claim 15, further comprising:
   a wrist strap operatively coupled on a first end thereof with the mounting member, the wrist strap defining a loop on a second end thereof wherein the loop is adapted for encircling a wrist of an associated user of the associated tablet device.

18. A support stand apparatus for use with an associated tablet device having a generally rectangular conformation with opposite front and rear substantially planar surfaces, the apparatus comprising:
   a mounting member comprising a first end disposed on the substantially planar rear surface of the associated tablet device and a second end opposite the first end and spaced apart from the substantially planar rear surface of the associated tablet device by a predetermined distance D; and
   a support stand comprising a first end configured to engage an associated work surface for supporting the associated tablet device relative to the associated work surface, and a second end opposite the first end and being pivotably coupled with the mounting member wherein the support stand is pivotable in selected positions relative to the mounting member for supporting the associated tablet device in selected positions relative to the associated work surface;
   wherein the mounting member comprises a plurality of block members mutually spaced apart on the substantially planar rear surface of the associated tablet device;
   wherein the first end of the support stand comprises at least two leg members for supporting the associated tablet device in the selected positions relative to the associated work surface;
   wherein the plurality of block members comprises at least one block member disposed adjacent to each corner of the rear surface of the associated tablet device having the generally rectangular conformation;
   wherein the at least two leg members of the support stand are mutually coupled for joint movement between the selected positions relative to the mounting member;
   wherein the first end of the support stand comprises a timing bar member mutually coupling the at least two leg members of the support stand for joint movement between the selected positions relative to the mounting member, wherein the timing bar member has an elongate generally cylindrical shape configured to be gripped by the hand of the associated user of the associated tablet device;
   wherein the second end of the support stand is pivotably coupled with the mounting member wherein the support stand is pivotable in the selected positions relative to the mounting member for supporting the associated tablet device in the selected positions relative to the associated work surface;
   wherein at least one of the second end of the support stand and the mounting member defines at least one detent, and the other of the second end of the support stand and the mounting member carries a ball member biased into selected engagement with the detent for locating the support stand in the selected positions relative to the mounting member for supporting the associated tablet device in the selected positions relative to the associated work surface.

* * * * *